Figure 1:
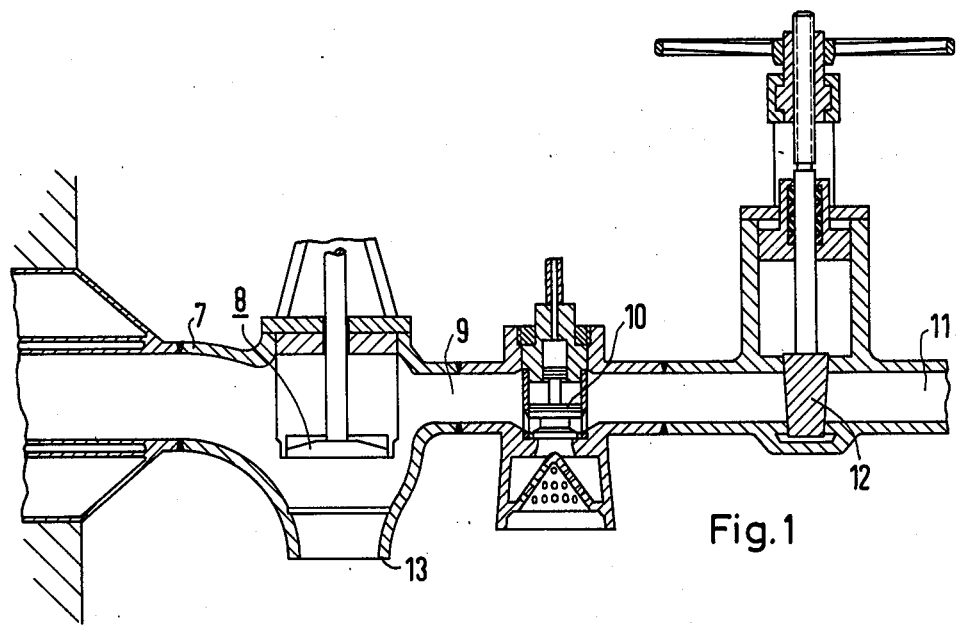

United States Patent [19]

Hoffmann

[11] 4,280,871
[45] Jul. 28, 1981

[54] LIVE STEAM SHUT-OFF DEVICE FOR PRESSURIZED WATER REACTORS

[75] Inventor: Jürgen Hoffmann, Erlangen, Fed. Rep. of Germany

[73] Assignee: Kraftwerk Union Aktiengesellschaft, Mülheim an der Ruhr, Fed. Rep. of Germany

[21] Appl. No.: 862,626

[22] Filed: Dec. 20, 1977

Related U.S. Application Data

[63] Continuation of Ser. No. 427,148, Sep. 27, 1976, abandoned, which is a continuation of Ser. No. 539,422, Jan. 8, 1975, abandoned.

[30] Foreign Application Priority Data

Jan. 25, 1974 [DE] Fed. Rep. of Germany ....... 2403668

[51] Int. Cl.³ ............................................. G21C 9/00
[52] U.S. Cl. .................................................... 176/38
[58] Field of Search ................... 176/37, 38, 58, 87, 176/60, 65

[56] References Cited

U.S. PATENT DOCUMENTS

| 787,341 | 4/1905 | Mitchell et al. | 176/38 |
|---|---|---|---|
| 1,278,067 | 9/1918 | MacDonald | 122/32 |
| 1,349,594 | 8/1920 | Wafer et al. | 76/38 |
| 3,140,982 | 7/1964 | Haines et al. | 176/58 |
| 3,185,631 | 5/1965 | Long et al. | 176/65 |
| 3,818,935 | 6/1974 | Karker et al. | 176/65 |
| 3,819,476 | 6/1974 | Pocock et al. | 176/38 |
| 4,039,377 | 8/1977 | Andrieu | 176/65 |
| 4,057,077 | 11/1977 | Schabert et al. | 176/37 |
| 4,066,498 | 1/1978 | Hoffman et al. | 176/38 |
| 4,077,837 | 3/1978 | Schabert et al. | 176/38 |
| 4,092,214 | 5/1978 | Schabert et al. | 176/65 |

FOREIGN PATENT DOCUMENTS

2345580 12/1974 Fed. Rep. of Germany ............. 176/38

*Primary Examiner*—S. A. Cangialosi
*Attorney, Agent, or Firm*—Herbert L. Lerner

[57] ABSTRACT

Shut-off device for a double-wall steam line extending out of a safety vessel of a pressurized water reactor includes a shut-off valve having a casing, the casing being directly connected to an end of a lead-through for the double-wall steam line, the casing being formed with steam inlet and outlet openings and with a further opening, and at least one of a safety and an exhaust gate valve having a casing, the last-mentioned casing being directly connected to the further opening.

4 Claims, 3 Drawing Figures

LIVE STEAM SHUT-OFF DEVICE FOR PRESSURIZED WATER REACTORS

This is a continuation, of application Ser. No. 727,148, dated Sept. 27, 1976, which is a continuation of Ser. No. 539,422, filed Jan. 8, 1975, both now abandoned.

The invention relates to a live steam shut-off device for pressurized water nuclear reactors and, particularly, to such a device for shutting off steam lines formed of double-walled tubes extending from a protective vessel of pressurized water nuclear reactors and which have shut-off, safety and/or blow-off valves inserted therein.

Pressurized water reactors, for the purpose of steam generation, and provided with heat exchangers that are disposed in a protective or containment vessel. The pressurized water heated in the reactor gives up heat to the feedwater in the heat exchangers and vaporizes the feedwater therein.

The exhaust steam lines leading from the protective vessel must be so constructed that even if a pipe rupture should occur, it would pose no danger to the surroundings. If one assumes that a weak spot exists in a pipe or tube of the heat exchanger, a rupture in the exhaust steam line can cause a crack or tear to form in the heat exchanger tube due to the rapid pressure drop in the heat exchanger which is a consequence of the break in the exhaust steam line. Radioactive substances can thereby penetrate into the live steam line and, if the pipe rupture should occur outside the protective vessel, can be released to the surroundings.

In order to prevent this possible consequence of a pipe rupture, it is necessary to insert a shut-off valve into the exhaust steam line in the interior of the protective or containment vessel. This leads to considerable disadvantage, however, for example with respect to the accessibility of this shut-off valve.

Double-walled steam lines of the type contemplated for the invention are used when the protective vessel is bounded, on the one hand, by a steel shell or casing and, on the other hand, by a concrete wall spaced therefrom. Thus, the steel shell has the function of resisting any inner pressure that may be produced, while the concrete wall is supposed to protect the steel shell from external effects such as a possible airplane crash.

In order to prevent excess pressure from being exerted on the steel shell or hull from the outside in the event a break occurs in a pipe at a location in the intermediate space between the steel shell and the concrete wall, the exhaust steam lines are of double-wall construction in that intermediate space. However, these double-walled pipes or tubes must end before the respective lines are connected to a shut-off valve.

It is the object of the invention of this application to provide a live steam shut-off device for pressurized water reactors wherein only one shut-off valve must be provided outside the protective vessel to make it impossible for a pipe rupture to occur outside the safety vessel forward of the valve.

With the foregoing and other objects in view, there is provided in accordance with the invention, a shut-off device for a double-wall steam line extending out of a safety vessel of a pressurized water reactor comprising a shut-off valve having a casing, the casing being directly connected to an end of a lead-through for the double-wall steam line, the casing being formed with steam inlet and outlet openings and with a further opening, and at least one of a safety and an exhaust gate valve having a casing, the last-mentioned casing being directly connected to the further opening.

Other features which are considered as characteristic for the invention are set forth in the appended claims.

Although the invention is illustrated and described herein as embodied in live steam shut-off device for pressurized water reactors, it is nevertheless not intended to be limited to the details shown, since various modifications and structural changes may be made therein without departing from the spirit of the invention and within the scope and range of equivalents of the claims.

Figure 2:
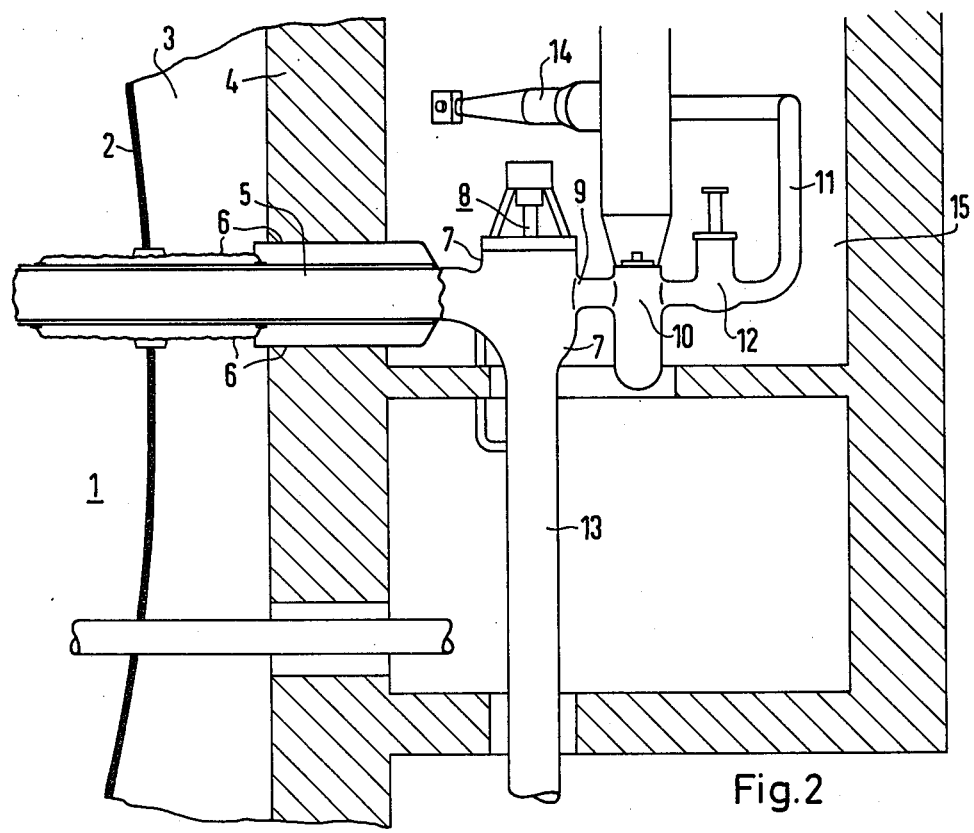
Figure 3:
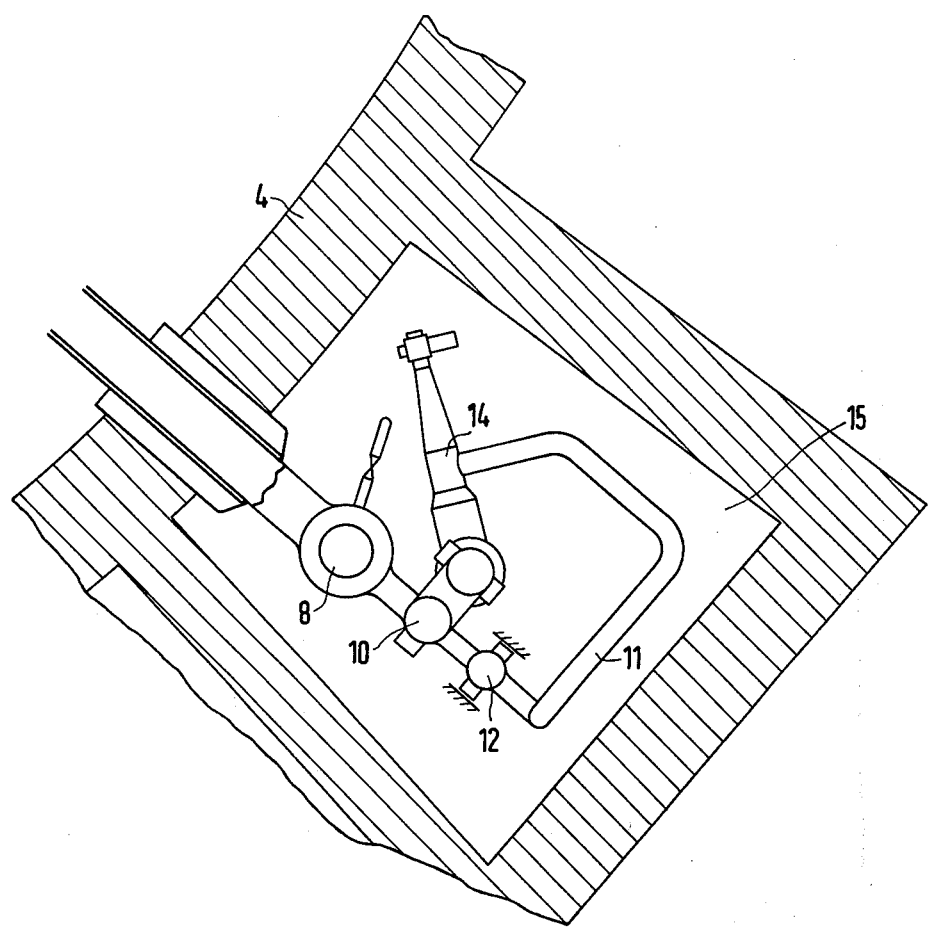

The construction and method of operation of the invention, however, together with additional objects and advantages thereof will be best understood from the following description of specific embodiments when read in connection with the accompanying drawings in which:

FIGS. 1, 2 and 3 are respective longitudinal sectional, elevational and top plan views, the latter two views partly in section, of the live steam shut-off device for pressurized water reactors constructed in accordance with the invention.

Referring now to the figures of the drawing, there are shown therein a protective or containment vessel 1 formed of a steel casing 2 and a concrete wall 4 spaced from the steel casing 2. An exhaust steam line 5 passes through the steel casing 2 and the concrete wall 4 and, in the intermediate space 3 between the steel casing 2 and the concrete wall 4 and in vicinity of lead-throughs 6 of the exhaust steam line 5, the latter is constructed as a double-walled tube. The effect of a break or rupture of the inner wall of the double-walled tube 5 is that the discharging steam flows into the interior of the protective or containment vessel 1, as shown by the curved arrows in FIG. 2, without any possibility of the production of an excess pressure in the intermediate space 3.

The housing 7 of a shut-off valve 8 is directly welded according to the invention, to the outer end of the lead-through 6. Moreover, the housing 7 of the shut-off valve 8 is formed with an additional opening 9 to which a safety valve 10 is welded. An exhaust or blow-off gate valve 12 is directly connected to a second opening that is formed in the safety valve 10. The blow-off or exhaust line 11 which is connected thereto and leads to a start-up control valve 14. All of the valves are disposed in an armature of valve chamber 15 which is connected at the outside directly to the concrete wall 4 of the protective of containment vessel 1.

It is apparent that no pipelines are located forward of the shut-off valve 8 up to the exhaust or blow-off gate valve 12 outside the concrete wall 4. The housings for the valves 8, 10, 12 are, in addition, so dimensioned for reasons of strength and stability that rupture of the housings need not be feared. What is achieved thereby is that with a disposition of valves outside the containment vessel, clear security against pipe rupture is possible. Should a break or rupture occur in the steam discharge line 13 of the shut-off valve 8, the latter can be closed and thereby prevent radioactively contaminated steam from escaping into the atmosphere.

I claim:

1. In a pressurized water reactor having a safety vessel formed of a steel casing and a concrete wall surrounding and spaced from the steel casing, a double-wall steam discharge line extending from the steel casing through a hole formed in the concrete wall, the double-wall steam line having outer and inner walls defining an annular passage open inside the steel casing from returning steam escaping through a possible rupture in the inner wall back to the inside of the steel casing, and said line being closed outside the steel casing at a location spaced therefrom a distance at least equal to the distance between the steel casing and the concrete wall, a shut-off device disposed in said steam discharge line comprising exclusively one shut-off valve having a casing, said casing being directly connected to an end of said steam line outside said concrete wall, said casing being formed with steam inlet and outlet openings and with a further opening and means for closing said outlet opening, and at least one additional value having a casing formed with an inlet opening, said last-mentioned valve casing being directly connected by weldment to said first-mentioned valve casing so as to connect said inlet opening of said last-mentioned valve casing directly to said further openings.

2. Shut-off device according to claim 1 wherein the steam outlet of said shut-off valve casing is disposed at an angle of substantially 90° to the steam inlet to said shut-off valve, and said further opening connected to said last-mentioned casing is located opposite the steam inlet opening formed in said shut-off valve casing.

3. Shut-off device according to claim 1 wherein said additional valve is a safety valve.

4. Shut-off device according to claim 1 wherein said safety valve casing is formed with an outlet opening, an exhaust gate valve having a casing formed with an inlet opening, said casing of said exhaust gate valve being directly connected by weldment to said safety valve casing so as to connect said inlet opening of said exhaust gate valve casing directly to said outlet opening of said safety valve casing.

* * * * *